(12) United States Patent
Takimoto et al.

(10) Patent No.: US 8,726,318 B2
(45) Date of Patent: May 13, 2014

(54) MULTIMEDIA INFORMATION RECEIVING APPARATUS (75) Inventors: Yasuaki Takimoto, Tokyo (JP); Masahiro Abukawa, Tokyo (JP); Shinji Akatsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 989 days.

(21) Appl. No.: 12/444,107

(22) PCT Filed: Oct. 4, 2006

(86) PCT No.: PCT/JP2006/319879
§ 371 (c)(1),
(2), (4) Date: Apr. 2, 2009

(87) PCT Pub. No.: WO2008/041336
PCT Pub. Date: Apr. 10, 2008

(65) Prior Publication Data
US 2010/0115569 A1   May 6, 2010

(51) Int. Cl.
*H04N 7/20* (2006.01)

(52) U.S. Cl.
USPC ................ 725/68; 725/32; 725/34; 725/35; 725/36; 725/48; 725/49; 725/50; 725/54; 725/116; 725/146; 725/67; 725/70; 725/71; 455/3.02; 455/10; 455/12.1; 455/137; 455/427; 714/701; 714/746; 714/764; 714/751; 714/752; 714/758; 714/767; 714/763; 714/786; 375/290; 375/264; 375/225; 375/250

(58) Field of Classification Search
USPC ............ 725/32, 34–36, 48–50, 54, 116, 146, 725/67–68, 70–71; 455/3.02, 10, 12.1, 137, 455/427; 714/701, 746, 764, 751, 752, 758, 714/767, 763, 786; 375/290, 264, 225, 250
See application file for complete search history.

(56) References Cited

U.S. PATENT DOCUMENTS

| 6,314,289 | B1 * | 11/2001 | Eberlein et al. ............... 455/427 |
| 2003/0081671 | A1 | 5/2003 | Ishida et al. |
| 2005/0024543 | A1 | 2/2005 | Ramaswamy et al. |
| 2005/0153650 | A1 | 7/2005 | Hikomoto |
| 2005/0204399 | A1 | 9/2005 | Matsunobu et al. |

FOREIGN PATENT DOCUMENTS

| EP | 1 045 543 A2 | 10/2000 |
| EP | 1 139 589 A2 | 10/2001 |
| EP | 1521382 A2 | 4/2005 |
| JP | 2000-354023 A | 12/2000 |
| JP | 2002-533014 A | 10/2002 |
| JP | 2003-37571 A | 2/2003 |
| JP | 2003-134064 A | 5/2003 |

(Continued)

OTHER PUBLICATIONS

English Translation for Japanese Patent Application Publication 2004-357124.*

*Primary Examiner* — Jason Salce
(74) *Attorney, Agent, or Firm* — Birch, Stewart, Kolasch & Birch, LLP (57) ABSTRACT

A multimedia information receiving apparatus receives multimedia information which is transmitted by a broadcast system and receives multimedia information which is simultaneously transmitted by another transmission system such as IP communications, and generates one received information by selecting elements having a few errors from elements of demodulated broadcast system information and elements of demodulated other transmission system information and then arranging the selected elements.

9 Claims, 7 Drawing Sheets

(56) References Cited

FOREIGN PATENT DOCUMENTS

| | | |
|---|---|---|
| JP | 2004-297628 A | 10/2004 |
| JP | 2004-357124 A | 12/2004 |
| JP | 2005-223548 A | 8/2005 |
| JP | 2005-260758 A | 9/2005 |
| JP | 2006-174209 A | 6/2006 |
| JP | 2006-523417 A | 10/2006 |
| WO | WO 00/33559 A3 | 6/2000 |
| WO | WO-00/36783 A1 | 6/2000 |
| WO | WO-2004/080011 A1 | 9/2004 |

\* cited by examiner

MULTIMEDIA INFORMATION RECEIVING APPARATUS

FIELD OF THE INVENTION

The present invention relates to a multimedia information receiving apparatus that complements a stream via broadcast system by using a stream via network system to reduce transmission errors in a case in which multimedia information having the same description as a broadcast is distributed via a communication network.

BACKGROUND OF THE INVENTION

In recent years, digital broadcasting using a broadcasting satellite and digital terrestrial broadcasting have been carried out. On the other hand, distribution of digitized multimedia information, such as music and drama, has been also performed as the Internet has become widespread. As transmission methods of transmitting multimedia information have diversified this way, a receiving apparatus having a function of being able to enable users to selectively view and listen to any of pieces of multimedia information which are transmitted by way of a plurality of transmission systems by using only the single receiving apparatus has appeared. Furthermore, it can be expected that, as a provision method of providing information, a service for broadcasting and distributing some pieces of multimedia information having the same description simultaneously by way of different transmission systems becomes ready.

By the way, in a case in which some pieces of multimedia information having the same description are simultaneously provided by way of different transmission systems, as mentioned above, it can be expected that high-quality multimedia information having a smaller amount of errors is reconstructed if stream data which are received by way of a network system can be used in order to complement transmission errors of a stream which is received by way of a broadcast system.

As a conventional technology, there has been provided a multimedia information receiving apparatus that improves the quality of a video by combining main information which is transmitted by way of a broadcast system and supplement information which is transmitted by way of an IP (Internet Protocol) communication system (for example, refer to patent reference 1). The main information which is handled by this apparatus is I picture data and P picture data having higher priorities which construct video data which comply with the MPEG (Moving Picture Expert Group) 2 standards, while the supplement information is B picture data having a lower priority. These main information and supplement information are generated beforehand by a transmit side in such a way that they are separated from multimedia information, and are transmitted by way of different systems. For example, for a user who desires high quality, the receiving apparatus then combines the main information and the supplement information to reproduce a high quality video. Therefore, the transmit side needs to have equipment which generates different data for one program. However, because according to the conventional technology broadcast data having the same description are not transmitted by way of a different transmission system, it is difficult for the receiving apparatus to make users enjoy a program having an adequate image quality by using only supplement information transmitted by way of, for example, an IP system. Furthermore, patent reference 1 does not refer to any solutions of transmission errors at all.
[Patent reference 1] JP,2003-37571,A The present invention is made in order to solve the above-mentioned problems, and it is therefore an object of the present invention to provide a multimedia information receiving apparatus that reconstructs multimedia information with the amount of transmission errors being reduced and that enables reproduction of a high-quality image or sound in an environment where two pieces of multimedia information about an identical program are simultaneously transmitted in parallel by way of two different systems, respectively.

DISCLOSURE OF THE INVENTION

In accordance with the present invention, there is provided a multimedia information receiving apparatus having a function of receiving both digitized multimedia information which is transmitted by way of a broadcast system and digitized multimedia information which is transmitted by way of another transmission system different from the broadcast system, the multimedia information receiving apparatus including: a broadcast system receiving means for receiving the multimedia information which is transmitted by way of the broadcast system to acquire the multimedia information as broadcast system information; an other transmission system receiving means for receiving the multimedia information which is simultaneously transmitted in parallel with the multimedia information, which is transmitted by way of the broadcast system, by way of the other transmission system and which has the same description as the multimedia information, which is transmitted by way of the broadcast system, to acquire the received multimedia information as other transmission system information; and a combining means for generating one received multimedia information by selecting elements having a few errors from elements of the acquired broadcast system information and elements of the acquired other transmission system information and then arranging the selected elements.

Therefore, even when errors or data dropouts occur in one of the broadcast system and the other transmission system during transmission, the multimedia information receiving apparatus can always lower the error rate of the multimedia information which it uses for playback, and can also reduce degradations in the image quality and the audio quality.

PREFERRED EMBODIMENTS OF THE INVENTION

Hereafter, in order to explain this invention in greater detail, the preferred embodiments of the present invention will be described with reference to the accompanying drawings.

Embodiment 1

In this Embodiment 1, an example of a process of transmitting and receiving multimedia information by using a transport stream (Transport Stream; TS) which complies with an MPEG2 method will be explained. The present invention is not limited to this example, and can be similarly applied to methods of forming successive data from elements which are small units, such as packets, into which multimedia information is divided, and then transmitting the successive data, the methods including DSM-CC (Digital Storage Media-Command and Control) transmission, and IP over DVB (Digital Video Broadcasting) transmission.

Figure 1:
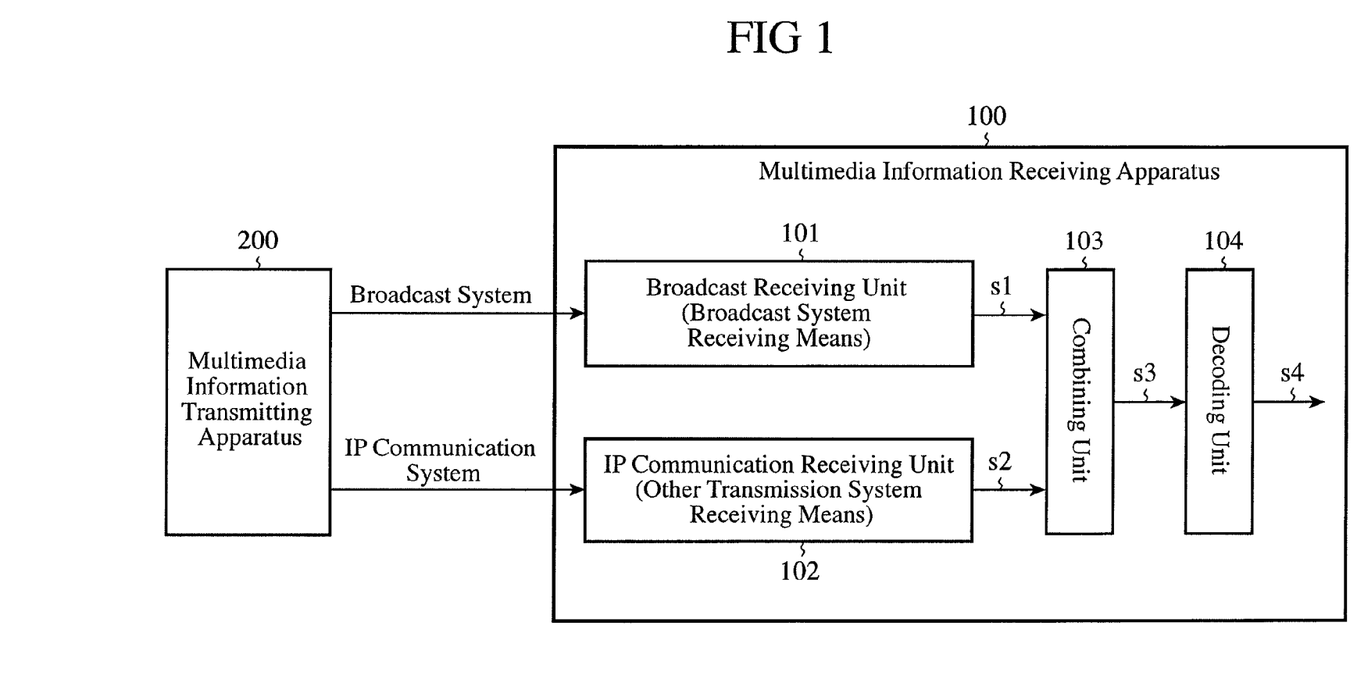
FIG. 1 is a block diagram showing the structure of a multimedia information receiving apparatus in accordance with Embodiment 1 of the present invention.

FIG. 1 is a block diagram showing the function configuration of the multimedia information receiving apparatus 100 in accordance with Embodiment 1 of the present invention. In the figure, the multimedia information receiving apparatus 100, as a function of receiving digitized MPEG-TSs having the same description, which are simultaneously transmitted in parallel by way of a broadcast system and an IP system, and then playing back them, includes a broadcast receiving unit (a broadcast system receiving means) 101, an IP communication receiving unit (an other transmission system receiving means) 102, a combining unit 103, and a decoding unit 104.

The broadcast receiving unit 101 is a means for receiving multimedia information transmitted thereto by way of the broadcast system, and for demodulating the multimedia information to generate a broadcast system TS (broadcast system information) which is an MPEG-TS. The IP communication receiving unit 102 is a means for receiving multimedia information which is simultaneously transmitted, in parallel with that transmitted by way of the broadcast system, by way of the IP communication system which is a transmission system different from the broadcast system, and which is the same as that transmitted by way of the broadcast system, and for demodulating the multimedia information to generate an IP system TS (other transmission system information) which is an MPEG-TS. The combining unit 103 is a means for generating one combined MPEG-TS by selecting TS packets having a few errors from the TS packets of the broadcast system TS (the elements of the broadcast system information) and the TS packets of the IP system TS (the elements of the other transmission system information), and then arranging the TS packets which the combining unit has selected. The decoding unit 104 is a means for decoding the combined MPEG-TS to reproduce video and audio data.

Next, the operation of the apparatus shown in FIG. 1 will be explained.

Hereafter, it is assumed that a multimedia information transmitting apparatus 200 transmits MPEG-TSs which are two pieces of multimedia information about an identical program simultaneously in parallel by way of a broadcast electric wave and an IP communication network. The broadcast receiving unit 101 receives and demodulates the broadcast wave to acquire a broadcast system TS s1 about the program, and outputs the acquired broadcast system TS s1 to the combining unit 103. On the other hand, the IP communication receiving unit 102 receives an IP communication signal (other transmission system information) transmitted thereto via the IP system network, and extracts an IP system TS s2 from the IP communication signal and outputs the IP system TS s2 to the combining unit 103. The combining unit 103 selects a TS packet having a few errors from each TS packet of the broadcast system TS s1 input thereto and a corresponding TS packet of the IP system TS s2 input thereto and then arranges the TS packet which the combining unit has selected to generate a received MPEG-TS s3, and outputs this MPEG-TS s3 to the decoding unit 104. The decoding unit 104 decodes the combined MPEG-TS s3 inputted thereto to generate and output video and audio data s4.

Figure 2:
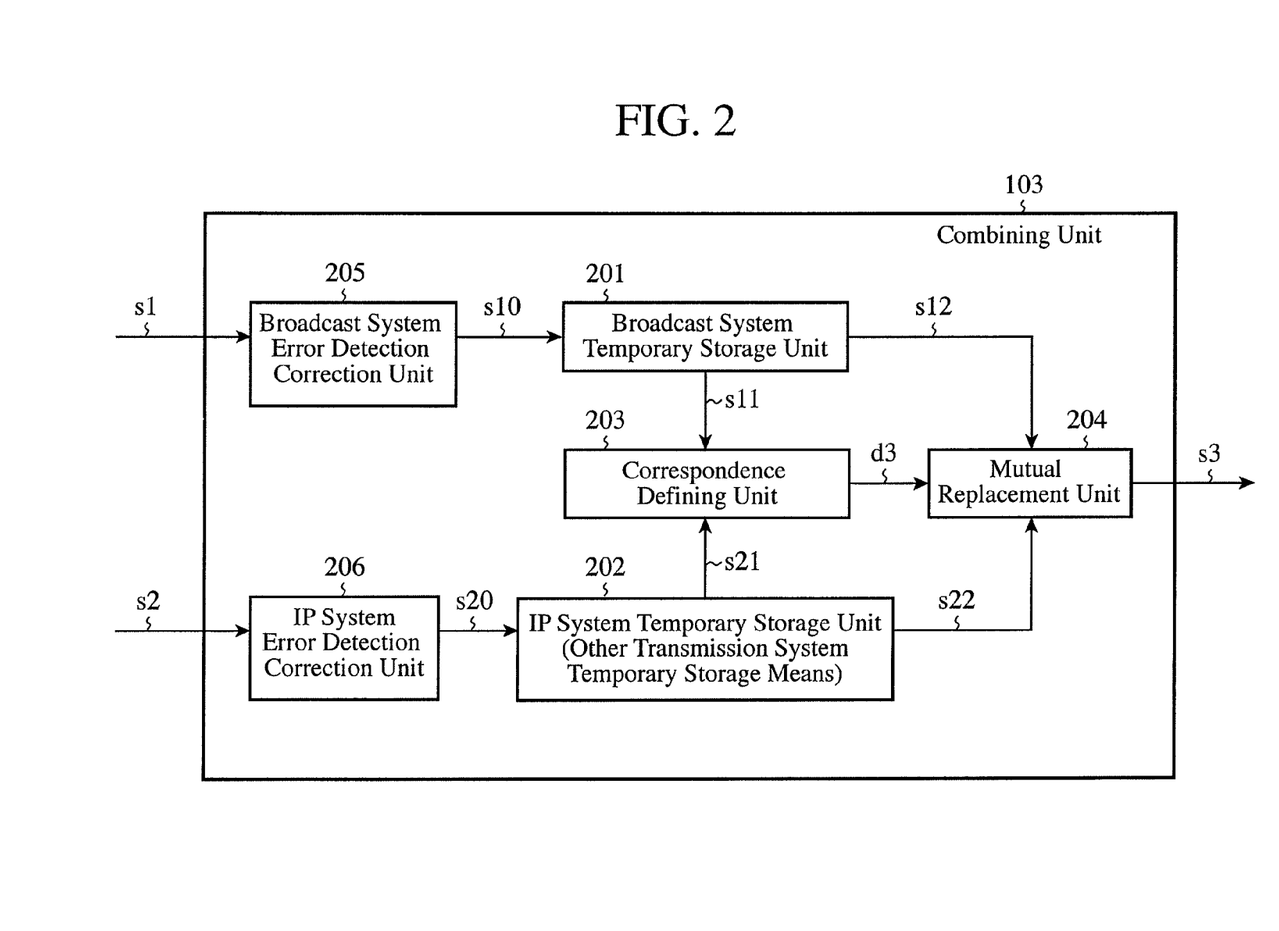
FIG. 2 is a block diagram showing the function configuration of a combining unit in accordance with Embodiment 1 of the present invention.

The function configuration of the combining unit 103 shown in FIG. 2 will be explained.

The combining unit 103 includes a broadcast system temporary storage unit 201, an IP system temporary storage unit (an other transmission system temporary storage means) 202, a correspondence defining unit 203, a mutual replacement unit 204, a broadcast system error detection correction unit 205, and an IP system error detection correction unit 206. The broadcast system error detection correction unit 205 is a means for performing an error detection and a correction on the broadcast system TS which the broadcast receiving unit 101 has acquired by demodulating the broadcast wave, and for adding the error condition of the broadcast system TS to the corrected broadcast system TS and outputting this broadcast system TS. The IP system error detection correction unit 206 is a means for performing an error detection and a correction on the IP system TS which the IP communication receiving unit 102 has acquired by demodulating the IP communication signal, and for adding the error condition of the IP system TS to the corrected IP system TS and outputting this IP system TS. The broadcast system temporary storage unit 201 is a means for storing the error-corrected broadcast system TS temporarily, and for outputting, as a unit to be processed, a broadcast system TS about a predetermined time range. The IP system temporary storage unit 202 is a means for storing the error-corrected IP system TS temporarily, and for outputting, as a unit to be processed, an IP system TS about a predetermined time range.

The correspondence defining unit 203 is a means for defining correspondences between TS packets of the broadcast system TS about the predetermined time range and TS packets of the IP system TS about the predetermined time range, respectively, and for determining TS packet pairs as replacement candidates by evaluating the degree of similarity between the TS packets of each pair which are brought into correspondence with each other to output, as replacement candidate information, the identification symbols of the TS packets of each pair which is determined as a replacement candidate. The mutual replacement unit 204 is a means for extracting the broadcast system TS about the predetermined time range which is subjected to the correspondence defining process from the broadcast system temporary storage unit 201, and also extracting the IP system TS about the predetermined region which is subjected to the same correspondence defining process from the IP system temporary storage unit 202, and for selecting TS packets having a few errors from the TS packets of the broadcast system TS and the TS packets of the IP system TS on the basis of an identification signal specified by the replacement candidate information, and then arranging the TS packets which the mutual replacement unit has selected to generate a combined MPEG-TS about the predetermined time range.

Next, the operation of the combining unit 103 will be explained.

The broadcast system error detection correction unit 205 detects an error which may occur in each TS packet included in the broadcast system TS s1 inputted thereto by using an error correcting code added to each TS packet, and then makes a correction to the error. The broadcast system error detection correction unit then adds the error condition to each TS packet which has been corrected, and outputting each TS packet in turn to acquire a TS s10. On the other hand, the IP system error detection correction unit 206 detects an error which may occur in each TS packet included in the IP system TS s2 inputted thereto by using an error correcting code added to each TS packet in an application layer, and then makes a correction to the error. The IP system error detection correction unit then adds the error condition to each TS packet which has been corrected, and outputting each TS packet in turn to acquire a TS s20. The broadcast system temporary storage unit 201 temporarily stores the broadcast system TS s10 on which the error correction process has been performed by the broadcast system error detection correction unit 205, and outputs a broadcast system TS s11 about a predetermined time range to the correspondence defining unit 203. On the other hand, the IP system temporary storage unit 202 temporarily stores the IP system TS s20 on which the error correction process has been performed by the IP system error detection correction unit 206, and outputs an IP system TS s21 about a predetermined time range to the correspondence defining unit 203.

The correspondence defining unit 203 defines correspondences between TS packets which are elements of the broadcast system temporal TS s11 about the predetermined time range inputted thereto, and TS packets which are elements of the IP system temporal TS s21 about the predetermined time range inputted thereto by using a method which will be mentioned below. The correspondence defining unit then determines TS packet pairs as replacement candidates by evaluating the degree of similarity between the TS packets of each pair which are brought into correspondence with each other to output, as replacement candidate information d3, the identification symbols of the TS packets of each pair which is determined as a replacement candidate. When receiving the replacement candidate information d3, the mutual replacement unit 204 extracts the broadcast system TS packets s12 about the predetermined region which are subjected to the correspondence defining process from the broadcast system temporary storage unit 201, and also extracts the IP system TS packets s22 about the predetermined region which are subjected to the same correspondence defining process from the IP system temporary storage unit 202. Next, the mutual replacement unit 204 examines both the error condition of the TS packet of the broadcast system TS s12, the TS packet corresponding to one of the identification symbols of the TS packets of the TS packet pair specified by the replacement candidate information d3, and the error condition of the TS packet of the IP system TS s22, the TS packet corresponding to the other one of the identification symbols of the TS packets of the TS packet pair, and selects one of the TS packets having a few errors and arranges the TS packet which the mutual replacement unit has selected to generate and output a combined MPEG-TS s3 about the predetermined time range. This process is performed serially for each predetermined time range of the broadcast system TS s1 and for each predetermined time range of the IP system TSs 2.

In accordance with the structure of the combining unit 103 explained with reference to FIG. 2, because the broadcast system error detection correction unit 205 and the IP system error detection correction unit 206 perform error reduction on the TS packets included in the broadcast system TS s1 and the TS packets included in the IP system TS s2, respectively, errors which can occur in the correspondence defining process performed by the correspondence defining unit 203 can be reduced.

In contrast, the IP communication receiving unit 102 can be alternatively constructed in such a way as to perform a detection and a correction of errors which occur in the IP system in advance. This error detection and correction method is implemented by using, for example, an error detecting code or an error correcting code added in a data link layer, such as Ethernet (registered trademark), so that IP packets having an error are removed. In this case, because all the TS packets included in the IP system TS s2 can be handled as TS packets not including any errors, the IP system error detection correction unit 206 of FIG. 2 can be eliminated, and the combining unit can be constructed in such a way as to provide the IP system TS s2 directly to the IP system temporary storage unit 202.

Figure 7:
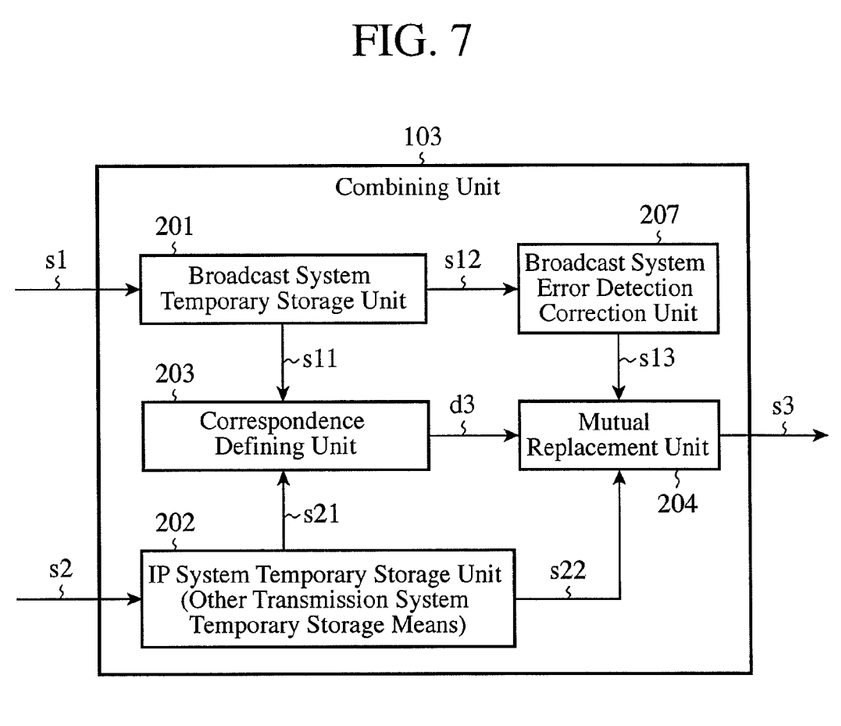
FIG. 7 is a block diagram showing the function configuration of another example of the combining unit in accordance with Embodiment 1 of the present invention.

Furthermore, in the case in which the IP communication receiving unit 102 is constructed in such a way as to perform a detection and a correction of errors which occur the IP system, the combining unit 103 can be alternatively constructed as shown in FIG. 7. In this example, a broadcast system error correcting unit 207 makes an error correction to the TS packet s12 which the mutual replacement unit 204 has acquired from the broadcast system temporary storage unit 201 by using an error correcting code added to the TS packet as much as possible, and provides a corrected TS packet s13 to the mutual replacement unit 204. According to this structure, when the broadcast system TS packet s12 is brought into correspondence with an IP system TS packet s22, the broadcast system error correcting unit does not have to make any correction to the broadcast system TS packet s12, the additional process can be reduced accordingly.

Figure 3:
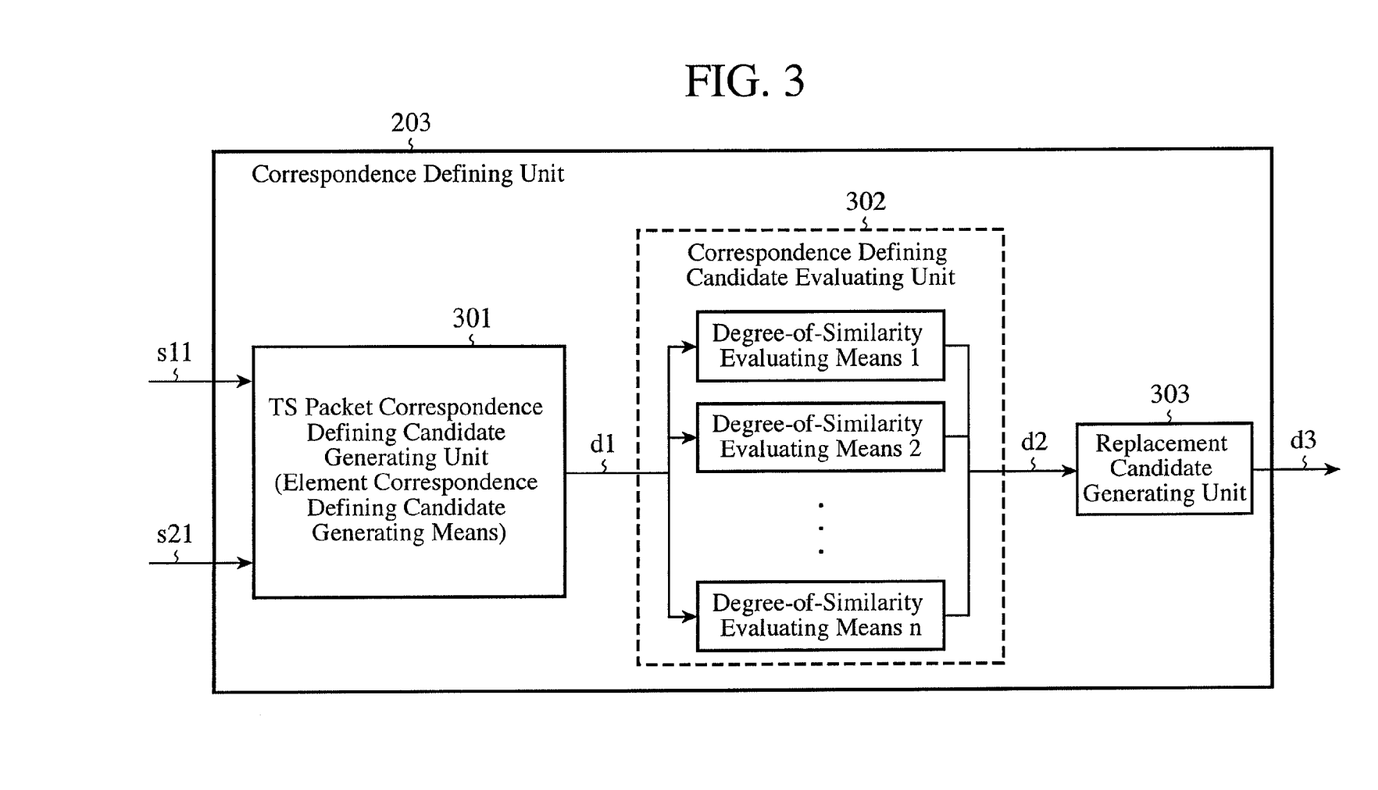
FIG. 3 is a block diagram showing the function configuration of a correspondence defining unit in accordance with Embodiment 1 of the present invention.

The function configuration of the correspondence defining unit 203 shown in FIG. 3 will be explained.

The correspondence defining unit 203 includes a TS packet correspondence defining candidate generating unit (an element correspondence defining candidate generating means) 301, a correspondence defining candidate evaluating unit 302 which consists of one or more degree-of-similarity evaluating means, and a replacement candidate generating unit 303.

The TS packet correspondence defining candidate generating unit 301 is a means for defining correspondences between the TS packets of a broadcast system TS about a predetermined time range which is a unit to be processed, and the TS packets of an IP system TS about the same predetermined time range to generate in turn TS packet correspondence defining candidates (element correspondence defining candidates). The correspondence defining candidate evaluating unit 302 is a means for evaluating the degree of similarity between a TS packet of the broadcast system TS and a TS packet of the IP system TS which are the ones of a TS packet correspondence defining candidate by using each of the one or more degree-of-similarity evaluating means on the basis of a preset evaluation criterion of the one or more degree-of-similarity evaluating means so as to acquire a TS packet degree-of-similarity evaluation result (an element degree-of-similarity evaluation result). The replacement candidate generating unit 303 is a means for assigning priorities to a series of TS packet degree-of-similarity evaluation results, which are acquired for a combination of some of the TS packet correspondence defining candidates, according to a predetermined criterion, for determining, as a replacement candidate, a TS packet pair which is a TS correspondence defining candidate having a higher priority, and for generating replacement candidate information which consists of the pair of the identification symbols of the TS packets which are the replacement candidate determined.

Next, the operation of the correspondence defining unit 203 will be explained.

Figure 4:
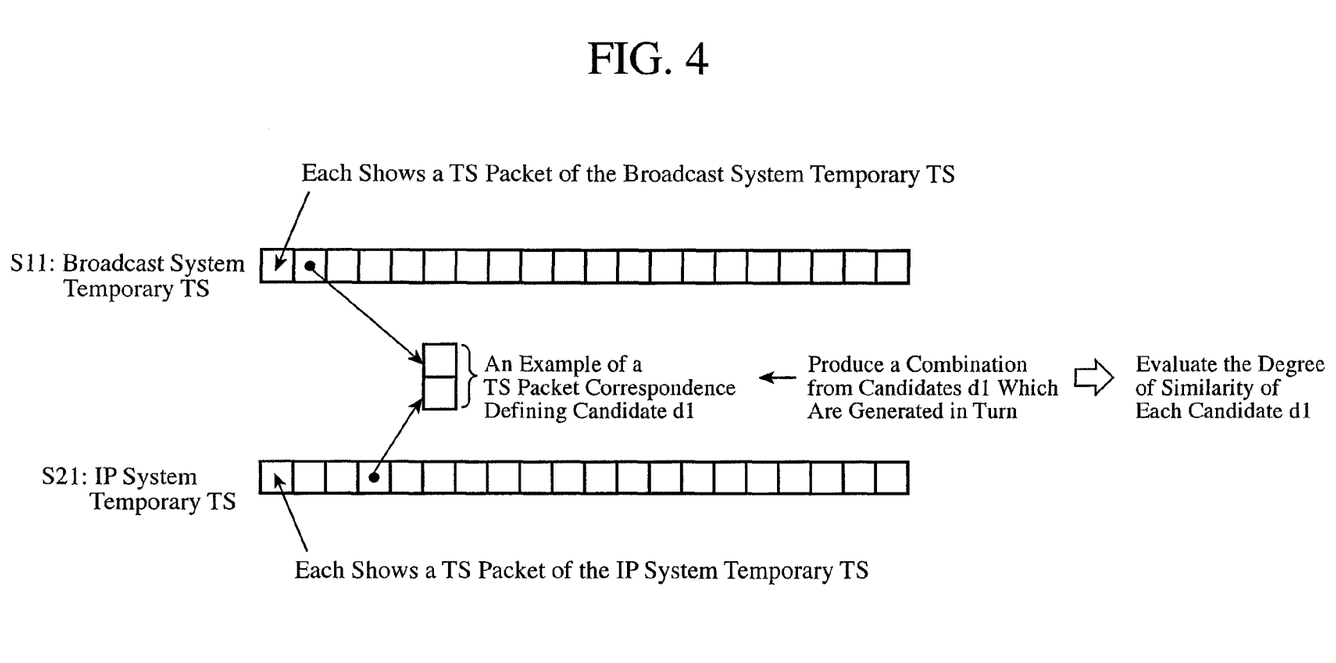
FIG. 4 is an explanatory drawing illustrating a generation method of generating TS packet correspondence defining candidates in accordance with Embodiment 1 of the present invention.

When receiving both a broadcast system TS s11 about a predetermined time range, which is a unit to be processed, and an IP system TSs21 about the predetermined time range, which is a unit to be processed, from the broadcast system temporary storage unit 201 and the IP system temporary storage unit 202, respectively, the TS packet correspondence defining candidate generating unit 301 defines correspondences between the TS packets which construct the broadcast system TS and the TS packets which construct the IP system TS. As illustrated in FIG. 4, in accordance with this method of defining correspondences between the TS packets which construct the broadcast system TS and the TS packets which construct the IP system TS, for example, one TS packet of the broadcast system is brought into correspondences with some TS packets of the IP system including a corresponding TS packet and TS packets before and behind the corresponding TS packet, respectively, so that some TS packet pairs are formed in turn. Each of these formed TS packet pairs is provided, as a correspondence defining candidate d1, to the correspondence defining candidate evaluating unit 302.

When receiving a TS packet correspondence defining candidate d1, the correspondence defining candidate evaluating unit 302 evaluates the degree of similarity between the TS packets of the candidate d1 by using one or more of the evaluation criteria of the degree-of-similarity evaluating means 1, 2, . . . , and n. It is assumed that the plurality of degree-of-similarity evaluating means 1, 2, . . . , and n include degree-of-similarity evaluating means each of which provides one of two levels of evaluation results, i.e., similarity or difference, and degree-of-similarity evaluating means each of which provides one of multiple numeric values as one of multiple levels of evaluation results of the degree of similarity.

As the evaluation criterion of the one or more degree-of-similarity evaluating means, for example, time information on the MPEG-TS (the multimedia information), a bit matching degree between the TS packet (element) of the broadcast system TS (the broadcast system information) and the TS packet (element) of the IP system TS (the other transmission system information), delimiter information on the MPEG-TS, and the error conditions of the target TS packets are used. In the case of MPEG-TS, as the time information, PCR (Program Clock Reference; reference time for determining information presentation time PTS and decoding start time DTS), PTS (Presentation Time Stamp; time of presentation of video and audio), DTS (Decoding Time Stamp; decoding start time), or the like is used. As the delimiter information, each start code of the image signal, the frame header of the audio signal, or the Section header is used.

For example, the evaluation of the degree of similarity is performed as follows. When both the broadcast system TS packet and the IP system TS packet are the ones for transmitting PCR and do not have any errors, and their PCR values are equal to each other, the degree-of-similarity evaluating means 1 evaluates that the broadcast system TS packet and the IP system TS packet are similar to each other, otherwise the degree-of-similarity evaluating means 1 evaluates that they are different from each other. When both the broadcast system TS packet and the IP system TS packet do not have any errors, but have the same description, the degree-of-similarity evaluating means 2 evaluates that the broadcast system TS packet and the IP system TS packet are similar to each other, otherwise the degree-of-similarity evaluating means 2 evaluates that they are different from each other. When both the broadcast system TS packet and the IP system TS packet do not have any errors, and the bit matching degree between them is equal to or larger than a constant bit matching degree, the degree-of-similarity evaluating means 3 evaluates that the higher matching degree those packets have, the higher degree of similarity they have.

The evaluations acquired by the degree-of-similarity evaluating means 1, 2, . . . , and n are outputted to the replacement candidate generating unit 303 as TS packet degree-of-similarity evaluation results d2.

In the replacement candidate generating unit 303, priorities are assigned to the evaluations acquired by the degree-of-similarity evaluating means 1, 2, and n in advance, and, when receiving the TS packet degree-of-similarity evaluation results d2, the replacement candidate generating unit selectively determines a TS packet pair as a replacement candidate in consideration of the priorities assigned to the TS packet degree-of-similarity evaluation results in such a way that no contradiction arises. For example, priorities are assigned to the evaluation results acquired by the degree-of-similarity evaluating means in such a way as "similarity shown by the degree-of-similarity evaluating means 1>similarity shown by the degree-of-similarity evaluating means 2>similarity shown by the degree-of-similarity evaluating means 3". However, when there are simultaneously two or more correspondence defining candidates having evaluation results acquired by one degree-of-similarity evaluating means of the same priority, a higher priority is given to one candidate having a higher degree of similarity.

A threshold about the degree of similarity is provided for each degree-of-similarity evaluating means, and TS packets whose degree-of-similarity is less than the threshold can be determined to be not similar to each other and can be removed.

The replacement candidate generating unit 303 performs this process on the correspondence defining candidates (a plurality of TS packet pairs) within the predetermined time range according to the following procedure.

STEP1: Determine the TS packet correspondence defining candidate having a degree-of-similarity evaluation result whose priority is the highest as a replacement candidate. However, when there is a contradiction between correspondences having the same priority, both of the correspondences are removed.

STEP2: Remove correspondence defining candidates having a lower priority which are contradictory to the TS packet correspondence defining candidate determined as a replacement candidate.

STEP3: Examine the TS packet correspondence defining candidates associated with the next degree-of-similarity evaluation results.

A contradiction between correspondence defining candidates means a case in which there are a plurality of correspondence defining candidates, and one TS packet of one system is brought into correspondences with a plurality of different TS packets of another system, or a case in which a plurality of correspondence defining candidates intersect with one another. Intersection mentioned hereafter shows such a case as that in which when the time sequence of two packets of system 1 is A→B and the time sequence of two packets of system 2 is C→D, the following correspondences; A-D and B-C are defined.

Figure 5:
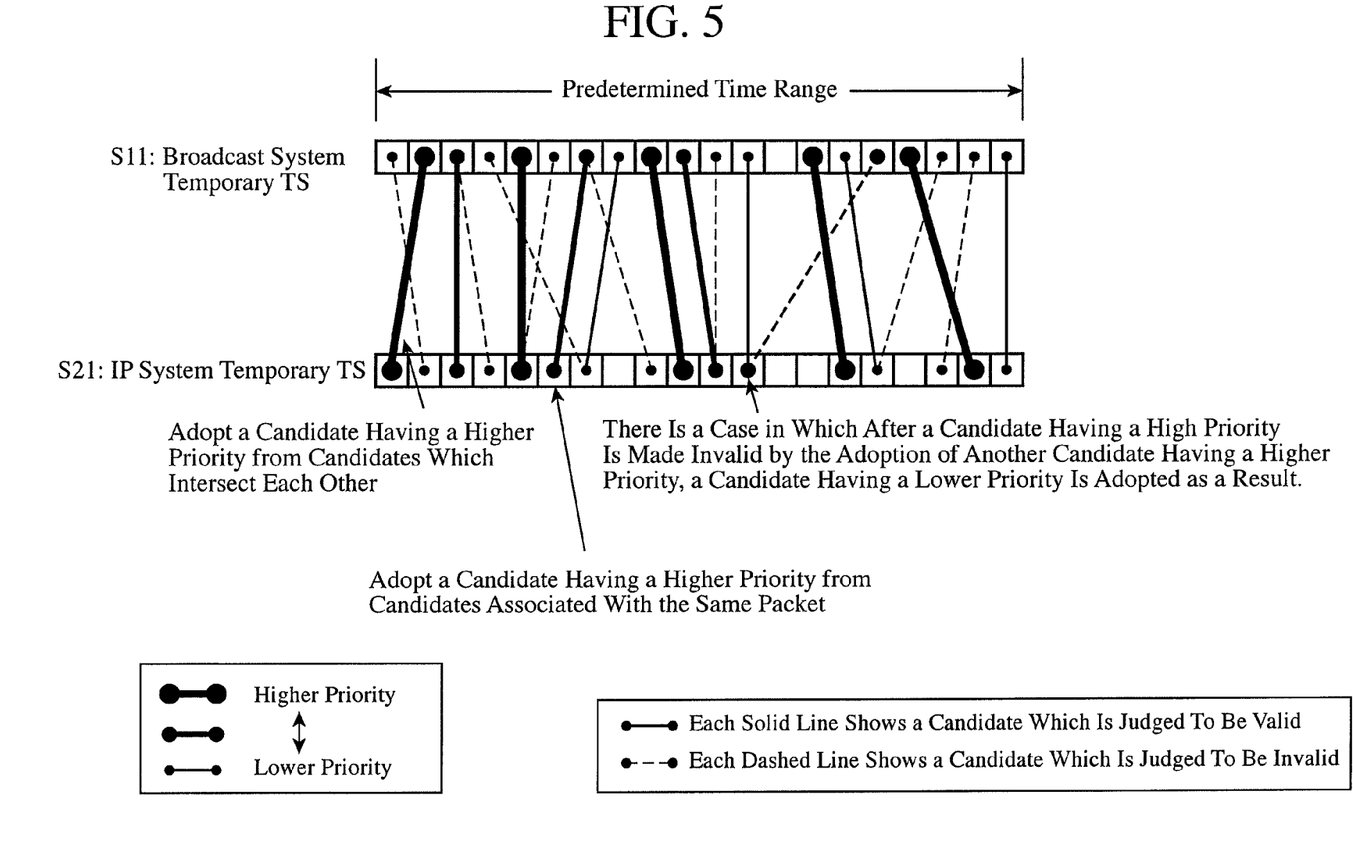
FIG. 5 is an explanatory drawing showing a generation method of generating replacement candidates in accordance with Embodiment 1 of the present invention.

An example of the generation method of generating replacement candidates will be explained with reference to FIG. 5.

In the replacement candidate generating unit 303, a priority and a threshold are provided for each degree-of-similarity evaluating means that generates a TS packet degree-of-similarity evaluation result d2. The replacement candidate generating unit selects in turn a correspondence defining candidate which do not intersect any other correspondence defining candidates having a higher priority than that assigned to the correspondence defining candidate with respect to time from the TS packet correspondence defining candidates whose degree of similarity is equal to or larger than the threshold, and defines the selected correspondence defining candidate as replacement candidate information.

Another example of the generation method of generating replacement candidates is provided as follows.

The replacement candidate generating unit generates in turn all combinations of TS packet degree-of-similarity evaluation results d2 each of which shows whether to include a TS packet correspondence defining candidate. Then, the replacement candidate generating unit determines an evaluated value for each TS packet correspondence defining candidate included in each of all the combinations in such a way that the evaluated value becomes equal to the sum total of values (a) to (d) as will be shown below. Next, the replacement candidate generating unit calculates the sum total of the values which the TS packet correspondence defining candidates included in each combination of TS packet degree-of-similarity evaluation results d2 have, and selects a combination whose sum total is the largest and defines each of the TS packet correspondence defining candidates in the selected combination of TS packet degree-of-similarity evaluation result d2 as a replacement candidate.

The value (a) which is acquired by multiplying the TS packet degree-of-similarity evaluation results d2 by a predetermined weight which is provided for the one or more degree-of-similarity evaluating means, respectively, and adding the element degree-of-similarity evaluation results respectively multiplied by the predetermined weight;

The value (b) which is acquired by multiplying a difference of an average of input time differences between the TS packets of the broadcast system information and the TS packets of the transmission system information in the replacement candidates which are included within a predetermined time interval after a current time, and an input time difference of the TS packet correspondence defining candidate in question by a predetermined weight;

The value (c) which is acquired by multiplying an evaluated value of another TS packet correspondence defining candidate which is associated with the same TS packet as that associated with the TS packet correspondence defining candidate in question by a weight larger than −1 and equal to or smaller than 0; and The value (d) which is acquired by multiplying an evaluated value of another TS packet correspondence defining candidate which intersects the TS packet correspondence defining candidate in question by a weight larger than −1 and equal to or smaller than 0.

Figure 6:
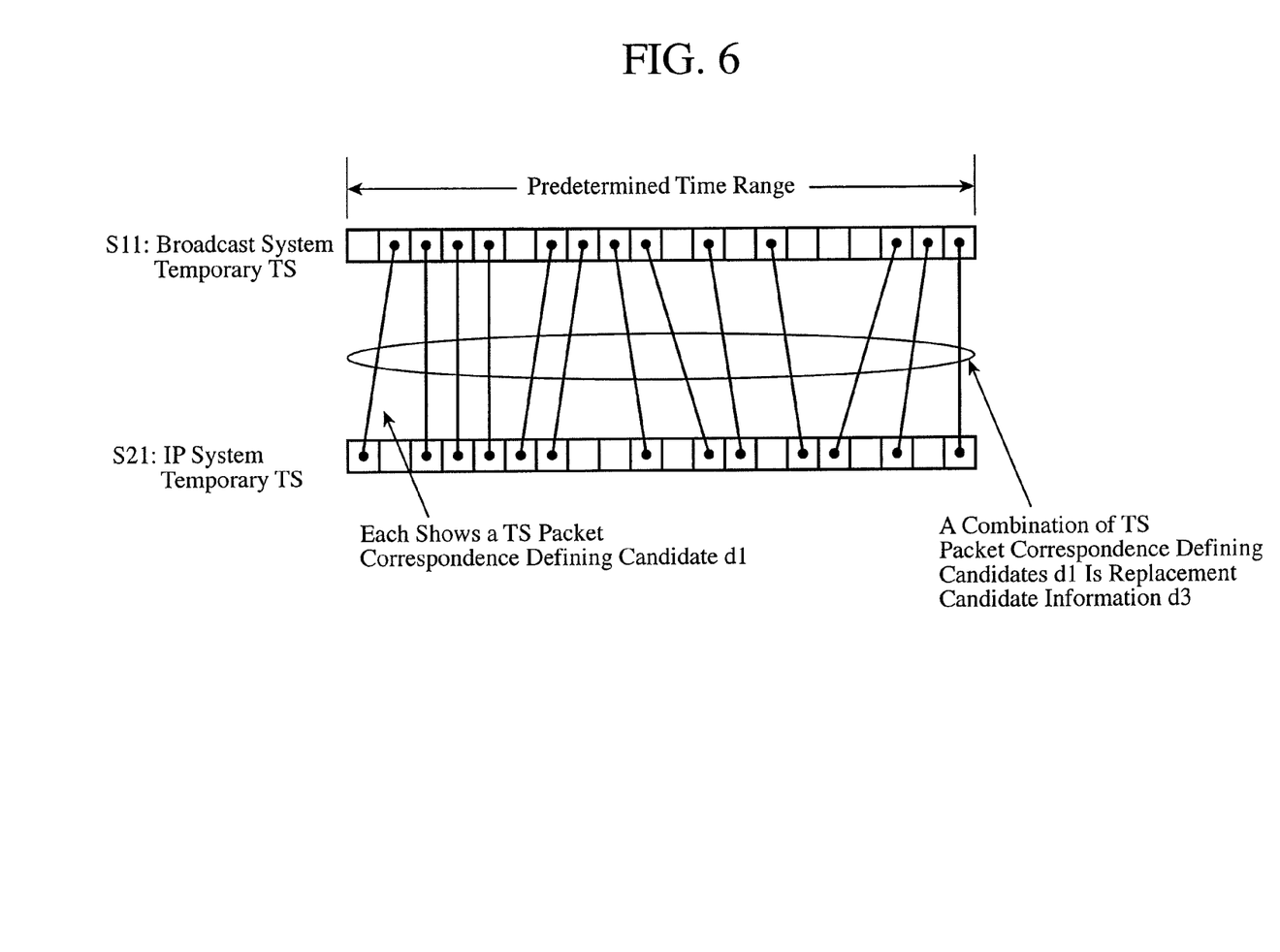
FIG. 6 is an explanatory drawing showing the configuration of replacement candidate information in accordance with Embodiment 1 of the present invention.

The replacement candidate generating unit 303 extracts the identification symbols of the TS packets from a TS packet pair which is each replacement candidate generated by using the above-mentioned method, and outputs the pair of identification symbols of each TS packet pair to the mutual replacement unit 204 as replacement candidate information d3. As illustrated in FIG. 6, the replacement candidate information d3 indicates a combination of one or more TS packet correspondence defining candidates d1 (TS packet pairs) which are determined selectively from the TS within the predetermined time range. Data about the replacement candidate information d3 are comprised of a pair of one identification symbol showing a TS packet of the broadcast system temporary TS s11 and one identification symbol showing a TS packet of the IP system temporary TS s21.

As mentioned above, on the basis of the replacement candidate information d3 acquired by the replacement candidate generating unit 303, the mutual replacement unit 204 performs a mutual replacement process of selecting a TS packet from each TS packet of the broadcast system TS s12 and a corresponding TS packet of the IP system TS s22 and arranging the TS packet which the mutual replacement unit has selected to generate a combined MPEG-TS s3 having a few errors. A detailed example of this mutual replacement processing method will be explained below.

First, as to a pair of TS packets of the broadcast system TS and the IP system TS which correspond to the identification symbols described in the replacement candidate information d3, the mutual replacement unit selects either of them (e.g., the TS packet of the broadcast system TS) when both the TS packets do not have any errors. When only one of the TS packets has an error, the mutual replacement unit selects the other TS packet which does not have any errors. By the way, as can be seen from the description of the above-mentioned correspondence defining process, the generated replacement candidate information d3 does not necessarily include all the pairs of TS packets of the broadcast system TS and the IP system TS as replacement candidates. Therefore, as to a pair of TS packets which do not have corresponding identification symbols in the replacement candidate information d3, and for which there exist packets which are a replacement candidate before and after the packets, the mutual replacement unit arranges the packets in an arbitrary order when they have different PIDs (Packet IDs). Furthermore, when the pair of TS packets has the same PID and have indexes of continuity, the mutual replacement unit arranges the TS packets in order of the indexes of continuity, whereas when the pair of TS packets has the same PID, but any indexes of continuity cannot be detected (the TS packets do not have any indexes of continuity, or it is assumed that the indexes of continuity have been broken due to errors), the mutual replacement unit arranges the TS packets in an order that is consistent with a higher-layer format than TS packets to combine the TS packets into a stream. In this case, the data in a higher layer than TS packets are, for example, PES (Packetized Elementary Stream) and Section.

As mentioned above, when MPEG-TSs having the same description are simultaneously transmitted thereto in parallel with each other by way of the broadcast system and the IP system, the multimedia information receiving apparatus in accordance with this Embodiment 1 receives the MPEG-TSs transmitted thereto by way of both the systems, and combines one received MPEG-TS by selecting good-quality TS packets having a few errors from the TS packets which construct the MPEG-TSs transmitted thereto by way of both the systems. Therefore, even when errors or data dropouts occur in one of the systems during transmission, the multimedia information receiving apparatus can always lower the error rate of the MPEG-TS which it uses for playback, and can also reduce degradations in the image quality and the audio quality.

INDUSTRIAL APPLICABILITY

As mentioned above, the multimedia information receiving apparatus in accordance with the present invention is constructed in such a way as to receive two pieces of multimedia information which are simultaneously transmitted in parallel with each other by way of a broadcast system and another transmission system different from this broadcast system, and combine the pieces of information received by way of the both systems so as to reduce transmission errors. Therefore, the multimedia information receiving apparatus in accordance with the present invention can be applied to a service for simultaneously providing the same program as a broadcast by using IP system distribution, which has been scheduled to be provided in recent years.

The invention claimed is:

1. A multimedia information receiving apparatus, comprising:
a broadcast system receiving unit configured to receive multimedia information which is transmitted by way of a broadcast system, and acquire the received multimedia information as broadcast system information;
an other transmission system receiving unit configured to receive multimedia information which is simultaneously transmitted by way of a transmission system other than the broadcast system in parallel with said multimedia information transmitted by way of the broadcast system, and acquire said received multimedia information as other transmission system information, where the multimedia information transmitted by way of both the broadcast system and the transmission system indicate an identical content;
a combining unit configured to select elements having fewer errors in between elements of said acquired broadcast system information and corresponding elements of said acquired other transmission system information, and generate a series of received multimedia information by combining the selected elements; and
a decoding unit configured to decode the one series of received multimedia information generated by the combining unit, and reproduce data by using the decoded information,
wherein the combining unit comprising:
a broadcast system temporary storage unit configured to temporarily store the broadcast system information which is demodulated by the broadcast system receiving unit, and output, as a unit to be processed, broadcast system information about a predetermined time range;
an other transmission system temporary storage unit configured to temporarily store the other transmission system information which is demodulated by the other transmission system receiving unit, and output other transmission system information about said predetermined time range.

2. The multimedia information receiving apparatus according to claim 1, wherein the combining unit further comprising:
a correspondence defining unit configured to define correspondences between elements of the broadcast system information about said predetermined time range and elements of the other transmission system information about said predetermined time range, respectively, evaluate a degree of similarity between elements of each pair which are brought into correspondence with each other so as to determine pairs of elements as replacement candidates, and output identification symbols of the elements of each of the pairs which are determined as the replacement candidates as replacement candidate information.

3. The multimedia information receiving apparatus according to claim 2, wherein the correspondence defining unit further comprising:

an element correspondence defining candidate generating unit configured to define correspondences between the elements of the broadcast system information about the predetermined time range which is a unit to be processed, and the elements of the other transmission system information about the same predetermined time range to generate element correspondence defining candidates in turn;
a correspondence defining candidate evaluating unit configured to evaluate a degree of similarity between an element of the broadcast system information and an element of the other transmission system information which are one said element correspondence defining candidate for each of one or more degree-of-similarity evaluating unit on a basis of a preset evaluation criterion of said one or more degree-of-similarity evaluating unit, and acquire a result of the evaluation of the degree of similarity between the elements; and
a replacement candidate generating unit configured to assign priorities to a series of results of the evaluation of the degree of similarity between the elements, which are acquired for a combination of some of said element correspondence defining candidates, according to a predetermined criterion, determine element correspondence defining candidates having a higher priority as replacement candidates, and generate replacement candidate information which consists of a pair of identification symbols of the elements of each of the replacement candidates determined.

4. The multimedia information receiving apparatus according to claim 3, wherein, when an element of the broadcast system information and an element of the other transmission system information which correspond to the identification symbols described in the replacement candidate information do not include any errors, a mutual replacement unit included in said combining unit selects one of the elements, or, when only one of the elements includes an error, selects the other element which does not include any error, and the mutual replacement unit arranges elements which do not have corresponding identification symbols in the replacement candidate information and for which there exist elements which are a replacement candidate before and after said elements in an arbitrary order when said elements are of different types, or, when said elements are of a same type, arranges said elements in such a way that when they have indexes of continuity, they are arranged in an order of the indexes, or, when any indexes of continuity cannot be detected, they are arranged in an order that is consistent with a higher-layer format to combine the elements, thereby acquiring combined multimedia information.

5. The multimedia information receiving apparatus according to claim 3, wherein the replacement candidate generating unit provides each degree-of-similarity evaluating unit with a predetermined priority and a threshold for element degree-of-similarity evaluation results, and selects in turn an element correspondence defining candidate which has an element degree-of-similarity evaluation result equal to or larger than said threshold as a feature thereof, which is not associated with a same element as another element correspondence defining candidate having an element degree-of-similarity evaluation result having a higher priority than said element degree-of-similarity evaluation result which said element correspondence defining candidate has, and which does not intersect another element correspondence defining candidate with respect with a time direction, so as to define said element correspondence defining candidate as a replacement candidate.

6. The multimedia information receiving apparatus according to claim 3, wherein the replacement candidate generating unit generates in turn all combinations of element degree-of-similarity evaluation results each showing whether to include an element correspondence defining candidate, determines an evaluated value for each of element correspondence defining candidates included in each of the combinations in such a way that the evaluated value is equal to a sum total of following values (a) to (d):
the value (a) which is acquired by multiplying the element degree-of-similarity evaluation results by a predetermined weight which is provided for the one or more degree-of-similarity evaluating unit, respectively, and adding the element degree-of-similarity evaluation results respectively multiplied by the predetermined weight;
the value (b) which is acquired by multiplying a difference of an average of input time differences between elements of the broadcast system information and elements of the transmission system information in replacement candidates which are included within a predetermined time interval after a current time, and an input time difference of said element correspondence defining candidate in question by a predetermined weight;
the value (c) which is acquired by multiplying an evaluated value of another element correspondence defining candidate which is associated with a same element as that associated with said element correspondence defining candidate by a weight larger than −1 and equal to or smaller than 0; and
the value (d) which is acquired by multiplying an evaluated value of another element correspondence defining candidate which intersects said element correspondence defining candidate by a weight larger than −1 and equal to or smaller than 0,
calculates a sum total of the values which the element correspondence defining candidates included in each combination of said element degree-of-similarity evaluation results have, selects a combination whose sum total is largest from all the combinations, and then defines each of the element correspondence defining candidates included in the selected combination of said element degree-of-similarity evaluation results as a replacement candidate.

7. The multimedia information receiving apparatus according to claim 2, wherein the broadcast system information and the other transmission system information are MPEG-TSs, and each element of the broadcast system information and the other transmission system information is a TS packet.

8. The multimedia information receiving apparatus according to claim 3, wherein the evaluation criterion of the one or more degree of similarity evaluating unit in the correspondence defining candidate evaluating unit is a proper combination of time information on the multimedia information, a bit matching degree between the element of the broadcast system information and the element of the other transmission system information, delimiter information on the multimedia information, and error conditions of the target elements.

9. The multimedia information receiving apparatus according to claim 2, further comprising:
a mutual replacement unit configured to extract the broadcast system information about the predetermined time range which is subjected to the correspondence defining process from said broadcast system temporary storage unit, and also extract the other transmission system information about the predetermined time range which is subjected to the correspondence defining process from said other transmission system temporary storage unit, and select elements having a few errors from the elements of said broadcast system information and the elements of said other transmission system information on a basis of an identification signal specified by said replacement candidate information and then arrange the selected elements to generate combined multimedia information about said predetermined time range.

* * * * *